United States Patent [19]
Buschmann

[11] 3,977,795
[45] Aug. 31, 1976

[54] METHOD OF DETERMINING THE MODULATION TRANSFER FUNCTION

[75] Inventor: Hans-Theo Buschmann, Cologne, Germany

[73] Assignee: AFGA-Gevaert, A.G., Leverkusen, Germany

[22] Filed: Feb. 11, 1974

[21] Appl. No.: 441,353

[30] Foreign Application Priority Data

Feb. 15, 1973 Germany............................ 2307489

[52] U.S. Cl................................. 356/256; 356/124
[51] Int. Cl.²..................... G02B 27/32; G01B 9/00
[58] Field of Search........................... 356/124–127, 356/256; 350/3.5

[56] References Cited
UNITED STATES PATENTS

| | | | |
|---|---|---|---|
| 3,519,358 | 7/1970 | Kuttner et al....................... | 356/124 |
| 3,708,217 | 1/1973 | McMahon............................ | 350/3.5 |

OTHER PUBLICATIONS

Scott et al., "The Use of Edge Gradients in Determining MTF"; Phot. Sci. and Eng.; vol. 7, 1963, p. 345.

Hariharan; "Evaluation of the MTF of Photographic Materials Using a Laser Speckle Pattern"; 9 Applied Optics 1482, June, 1970.

Primary Examiner—John K. Corbin
Assistant Examiner—Conrad Clark
Attorney, Agent, or Firm—Connolly and Hutz

[57] ABSTRACT

The invention relates to a method of determining the modulation transfer function of a recording support or of an optical system. In the context of the invention, an optical system includes any components with finite apertures which are required for forming an image of an object. A coherent-optically produced scatterer of known noise distribution or with a known spatial frequency spectrum is used for determining the required modulation transfer function. The modulation transfer function can be determined through the density of transparency distributions present on the recording support.

10 Claims, 12 Drawing Figures

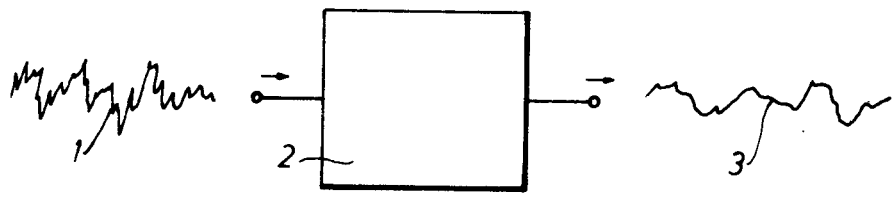
FIG. 1
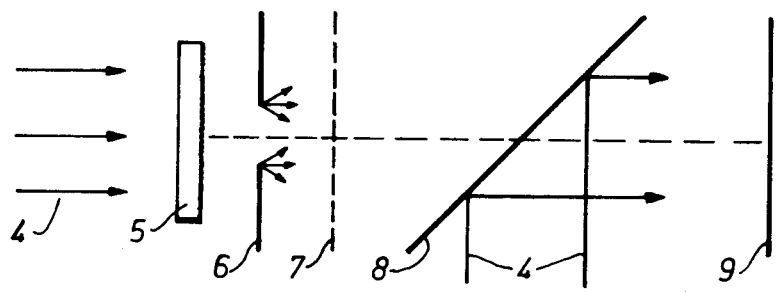
FIG. 2
FIG. 3
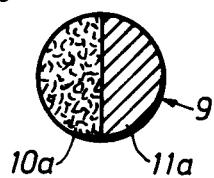
FIG. 3a
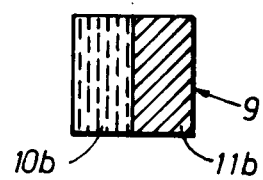
FIG. 3b
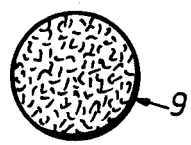
FIG. 3c
FIG. 3d

METHOD OF DETERMINING THE MODULATION TRANSFER FUNCTION

This invention relates to a method of determining the modulation transfer function of a recording support or of an optical system. In the context of the invention, an optical system includes any components with finite apertures (especially lenses and lens systems) which are required for forming an image of an object. A coherent-optically produced scatterer with known noise distribution or with a known spatial frequency spectrum is used for determining the required modulation transfer function.

The modulation transfer function (MTF) of optical and photographic systems is frequently determined using screens of sinusoidal transparency distribution whose spatial frequencies are known. In this case, the transferred modulations are determined by microphotometric scanning of the images. Since a number of spatial frequencies has to be used for determining a modulation transfer function, this process is extremely involved. The test screens are generally scanned through elongated narrow slots or multiple slots which have to be adjusted parallel to the test screen with extreme care which in some cases involves considerable difficulties.

In electrical technology (communications), it is known that the frequency characteristic of a system can be investigated by means of noise generators and corresponding frequency analysis. The band width of the noise generator has to exceed the band width of the system to be investigated. Analysis can be carried out by means of correlators or frequency analysers. This technique is fast and has been adapted to optical purposes for photographic recording materials by P. Hariharan (Evaluation of the Modulation Transfer Function of Photographic Materials using a Laser Speckle Pattern, Applied Optics 9 (1970) No. 6, P. 1482). In this method, a speckle pattern produced by a laser beam, which can be regarded as an optical noise source, is projected on to a film to be tested. After the film has been developed, it is illuminated with parallel, vertically incident laser beams and the intensity diffracted as a function of the angle is measured. The angle is then clearly associated with the spatial frequency. In order to eliminate the noise inherent in the film (graininess), the diffracted intensity of a second film specimen, which has been uniformly exposed and which has the same optical density as the speckle pattern, is also measured. After standardisation through the power density spectrum of the laser speckle pattern used for projection, it is possible to deduce the modulation transfer function of the film.

This process is attended by the following disadvantages:

1. Since the modulation transfer function is governed by wavelength, the values obtained using a laser beam, which is highly monochromatic, are totally different from those obtained where white light is used. However, it is always, investigation under white light that is of interest in practice because white light is almost always used in photography. It is only in this case that direct inferences as to the quality (sharpness, graininess) of the recording material can be drawn from the modulation transfer function.

2. When the latent image is developed, a phase structure (variation of refractive index) is formed in addition to the required amplitude structure (blackening) in the recording support. Whereas the phase components remaining do not affect production of the conventional photographic image, they do affect the coherently diffracted light. Accordingly, it is impossible to draw direct conclusions as to the important properties for image production from the measured modulation transfer function. Particularly large phase components are formed in cases where tanning developers are used.

In accordance with the mathematical-physical display, a modulation transfer function is said to be complex in cases where both absorption components and phase components are active during investigation of the image structure. Absorption corresponds to the real part and the phase component to the imaginary part of the complex modulation transfer function. For practical photography, however, it is only the real part that is of importance. In normal photographic images, phase components do not play any part at all.

The modulation transfer function of optical systems (lenses) is also governed by wavelength on account of dispersion effects. As in the case of recording materials, the modulation transfer function measured with white light is of practical interest in this case, too. A large number of optical image-reproducing instruments, notably microscopes, telescopes and cameras are used either in daylight or in artifical white light.

The optical diffraction methods for determining modulation transfer function described thus far require coherent light and are therefore unsuitable for white light.

An elegant optical diffraction method for directly determining modulation transfer function is described in German Published Application DOS No. 2,117,545. This method is based on a coherent-optically produced scatterer (speckle pattern). This speckle pattern is then copied on to a film of known MTF by means of the optical system to be tested. The coherent-optically projected Fourier Spectrum of the image structure is then obtained. In determining the modulation transfer function of photographic materials, the scatterer is projected on to the photographic material through a lens of known MTF. The Fourier Spectrum of the image structure is then produced again by diffraction.

As has already been mentioned, phase components are active during diffraction on the image structure. This means that the diffraction optically projected Fourier Spectrum cannot be directly used for determining modulation transfer function if, for example in the case of photographic materials, it is only the real part of the modulation transfer function that is being sought.

Since coherent, i.e. monochromatic light has to be used for producing the Fourier Spectrum, the process is unsuitable for white light.

The object of the invention is to develop a method for determining the modulation transfer function of recording supports and optical systems using white light. The modulation transfer function measured is intended to be directly used for assessing the quality of photographic materials and optical systems (lenses). This is only possible if the modulation transfer function is free from phase components. In addition, it is desired that the method should be fast and suitable for series measurements in photographic materials and optical systems. Only then can it be widely used in practice for quality control purposes. As already mentioned, this object is achieved using a coherent-optically produced scatterer of known noise distribution.

According to the invention there is provided a method of determining the modulation transfer function of a recording support, in which a coherent-optically produced scatterer of known noise distribution or with a known spatial frequency spectrum is used for determining the said modulation transfer function, wherein the scatterer is projected with incoherent light on to the recording support to be tested which is subsequently subjected to photographic processing, and wherein the density or transparency distribution present on the recording support is then scanned with a microphotometer whose output signal is frequency analysed or subjected to a correlation analysis.

According to the invention there is also provided a method of determining the modulation transfer function of an optical system, in which a coherent-optically produced scatterer of known noise distribution or with a known spatial frequency spectrum is used for determining the said modulation transfer function, wherein an image of the scatterer is formed by means of the optical system to be tested either in a recording plane or on a recording support of known modulation transfer function which is then subjected to photographic processing, and wherein the density or transparency distribution present in the recording plane or on the recording support is scanned with a microphotometer whose output signal is frequency-analysed or subjected to a correlation analysis.

The method according to the invention is equally suitable for investigating photographic materials (recording supports) and optical systems. The principle behind the invention can be applied in both cases.

The scatterer is preferably projected on to a recording support to be tested in the form of a contact copy or by means of an optical image-forming system. White light is advantageously used for this purpose, although instead of white light it would also be possible to use light in a selected region of the spectrum in cases where the MTF in this region of the spectrum is of interest. The spectral range of the microphotometer is selected accordingly. In cases that are of practical importance, the microphotometer works with white light. If, however it is intended to investigate the modulation transfer function in a certain region of the spectrum, filters are positioned in front of the microphotometer to pass this region of the spectrum only.

According to another aspect of the invention, a comparison field is projected on to the recording support, in addition to the projected scatterer, with incoherent diffuse light of the same intensity. In this case, the microphotometer scans both the projected scatterer and also the comparison field. It is possible in this way to eliminate the effect of noise inherent in the recording support.

In a preferred embodiment of the invention, the distribution of density on the recording support or in the recording plane is scanned either by rotation or by translation.

An important advantage of the invention is that it can be used to provide a rapid measuring technique. Another advantage is that it is only the real part of the modulation transfer function that is determined so that the modulation transfer function measured can be directly used for assessing the quality of the photographic films and papers. If it is desired to investigate colour films and papers, the modulation transfer function in the required regions of the spectrum (for example blue, green, red) can be determined relatively quickly by using corresponding spectral filters. In general, however, white light is used. This has not been possible using conventional methods of coherent optics.

Embodiments of the invention is described by way of example below with reference to the accompanying drawings, wherein:

FIG. 1 diagrammatically illustrates the measurement principle.

FIG. 2 shows how a scatterer (speckle pattern) is produced.

FIGS. 3a, 3b, 3c, 3d show various forms of the scatterer.

Figure 4:
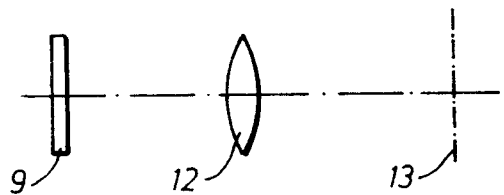
FIG. 4 illustrates the optical arrangement for determining the modulation transfer function of a lens.

In FIG. 1, the reference 1 denotes an optical noise spectrum whose three-dimensional band width and spectral power density are known. The spectrum is embodied in a coherent-optically produced scatterer. The noise spectrum 1 is transformed by a transmission system 2 to give an optical noise signal 3 from which the high frequencies of the input signal 1 are missing. Accordingly, the transmission system 2 acts as a low-pass filter. This low-pass behaviour corresponds exactly to the conditions prevailing in practice. The optical transmission system 2 consists either of the lens to be investigated or of the photographic material to be investigated. The output noise signal 3 shows that the fine structure of the input noise signal 1 is no longer being resolved. The output noise signal 3 is then converted into an analogue electrical signal and electronically analysed. In the event of linear transmission, the modulation transfer function enters quadratically into the transmission process so that conclusions on the modulation transfer function of the transmission system 2 can be drawn from measurement of the spectral power density of the output noise signal 3.

FIG. 2 shows an arrangement for producing scatterers of known noise distribution. A coherent light beam 4 emitted from a laser strikes a diffuser 5 (for example a mat disc) so that statically distributed phase differences are produced in the laser beam. The light scattered at the diffuser 5 then falls through a circular aperture 6 and an amplitude filter 7 on to an inclined semi-transparent mirror 8 and thence on to a photographic plate 9 situated behind this mirror. Light coherent with the laser beam 4a is introduced into the beam path through the inclined mirror 8. This reference beam interferes with the light wave scattered at the diffuser 5 and produces a speckle pattern on the plate 9. By varying the intensity ratio of the rays scattered at the diffuser and of the reference wave, it is possible to produce any desired modulations in the plane of the plate 9.

Any band widths and spectral power densities can be produced at the plate 9 by varying through the geometry of the aperture 6 and by varying the interval separating the plate 9 from the aperture 6. After development and fixing of the plate 9, the speckle pattern produced in this way acts as an optical noise source of known noise distribution. In the context of the invention, it is referred to here by definition as a coherent-optically produced scatterer.

FIGS. 3a and 3b shows some examples of these scatterers. The photographic plate 9 must have an extremely fine grain. Suitable materials are fine grain plates of the kind required for example in holography, for example Agfa Scientia 10E75 (Agfa Scientia in a Registered Trade Mark). FIGS. 3a and 3b show embodiments of scatterers of the kind used for determining the modulation transfer function of photographic materials. In addition to the actual scattering zone 10a, there is a comparison zone 11a exposed to diffuse light. The comparison zone is used for determining the noise inherent in the plate 9. Both the zones 10a, 11a and 10b, 11b are intended to have substantially the same optical density. If extremely fine-grained photographic plates or films are used to produce the scatters, there is no need to take the comparison zone 11a, 11b into account so that the speckle pattern and diffuse exposure can be obtained with a single projection. The comparison zone can of course also consist of non-scattering grey film.

Another somewhat more complicated method of determining the noise inherent in the film is to expose the film directly to diffuse light. In this case, there is no need for the comparison zone 11a, 11b. No comparison zone is present in the scatterers shown in FIGS. 3c and 3d, and these are used for determining the modulation transfer function of optical systems, especially lens systems.

The speckle patterns of the scatterers shown in FIGS. 3a and 3c have circular symmetry through the use of a circular aperture 6. The scatterers shown in FIGS. 3b and 3d have a preferential direction for the noise structure. They are obtained by using a rectangular aperture instead of the circular aperture 6.

A totally different method of producing scatterers is simply to use the grainy structure of a sufficiently coarse photographic material. However, it is almost impossible in this case to influence the noise distribution of the scatterer.

If it is desired to use the scatterers as contact screens for determining modulation transfer function, the photographic materials can be hardened in order to make them more resistant to scratching.

FIG. 4 shows an arrangement for determining the modulation transfer function of a lens. A lens 12 to be investigated produces an image of a scatterer 9 in a recording plane 13. The transparency or density distribution of this image is then either directly scanned with a microphotometer or recorded on a recording support of known MTF. In a second stage, the image present on the recording support is microphotometrically scanned and the noise spectrum determined.

Figures 5, 5A:
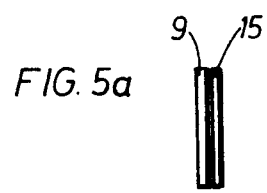
FIGS. 5a, 5b show optical arrangements for determining the modulation transfer function of a photographic material.
Figure 5B:
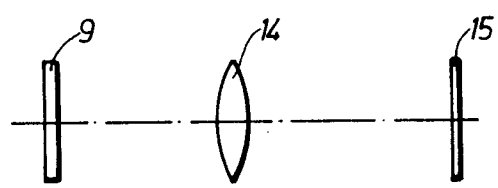

The modulation transfer function of a photographic material (recording support) is determined in accordance with FIG. 5. For this purpose, the scatterer 9 is projected on to the recording support 15 to be investigated either in the form of a contact copy (FIG. 5a) or by optical image formation through a lens 14 (FIG. 5b).

Figure 6:
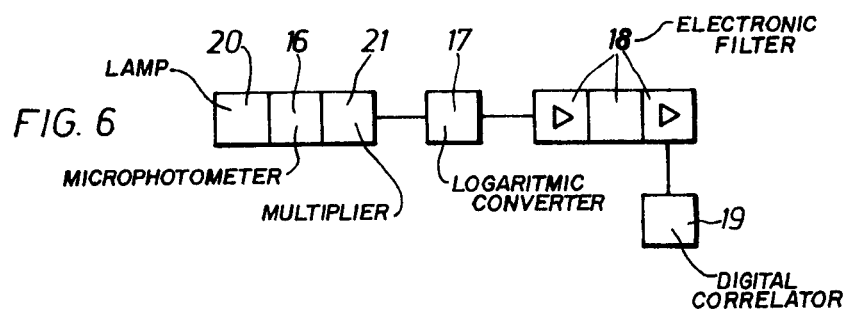
FIG. 6 is a block circuit diagram for the apparatus used for microphotometrically evaluating the samples.

An electronic apparatus used to evaluate density or transparency distribution in the recording plane 13 (FIG. 4) or on the recording support 15 (FIG. 5) is shown in the block diagram of FIG. 6. The important components are the microphotometer 16, a logarithmic converter 17, an electronic filter circuit 18 and a digital correlator 19. The inlet aperture of the microphotometer scans the film sample with the scatterer projected on to it either by rotation or by translation. A 100 watt halogen lamp 20 is used as the light source for the microphotometer 16. The lamp provides light of sufficient intensity to obtain an adequate signal-to-noise ratio with respect to the electronic noise of the system, even in the case of dense samples and in cases where colour filters are used. The transparency or density distribution determined by the microphotometer 16 is converted by a multiplier 21 into a corresponding electrical signal. This signal logarithmated by the converter 17. In this way, a signal consistent with the density distribution of the film sample to be investigated is obtained at the output of the converter.

Before analysis, the signals are filtered electronically by the filter circuit 18. A low-pass filter restricts the band width to the range of interest to the signal in order to obtain a favourable signal-to-noise ratio. A high-pass filter attenuates very low frequencies in order to suppress amplitude contributions emanating from possible cloudiness of the film. The output signal of the filter circuit is delivered to the correlator 19 which makes it possible to determine amplitude distribution or the accumulative frequency curve and to measure auto-correlations or cross-correlations. A suitable correlator is manufactured for example by Messrs. Hewlett-Packard under the serial No. 3721A. The Fourier transform N ($\nu$) is then calculated from the auto-correlation function formed by the correlator. It is identical with the Wien spectrum (c.f. for example M. De Belder and J. De Kerf, Phot. Sci, Eng. 11 (1967), P. 371, or C. Riva, Phot. Korr. 105 (1969) Pages 111, 128, 143, 159). The required modulation transfer function can be derived directly from the Wien spectrum.

Instead of correlation analysis, it would also be possible directly to carry out a frequency analysis. In this case, the correlator is replaced by an audio frequency analyser (for example Type FTA manufactured by Messrs. Rhode and Schwarz).

Figure 7:
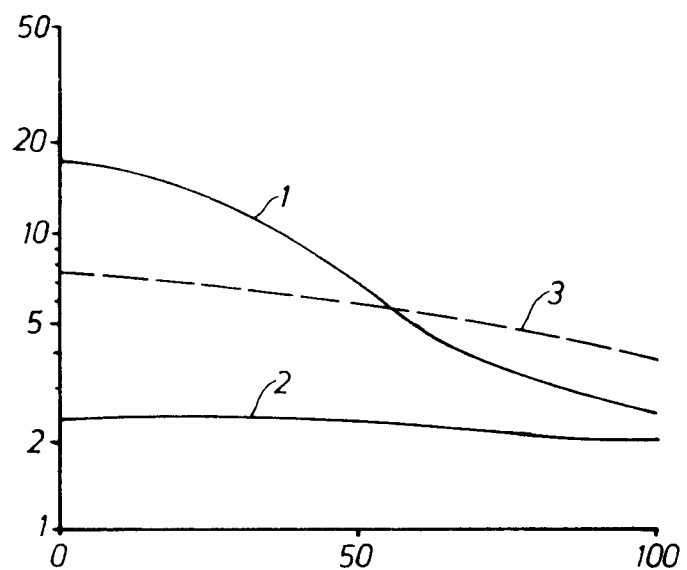
FIG. 7 is one example of the measurement results of a film sample.

FIG. 7 shows the Wien spectrum of a film sample with a scatterer projected on to it (Curve 1 : $N_K$). FIG. 7 also shows the Wien spectrum for the noise inherent in the film (Curve 3 : $N_F$) and the Wien spectrum of the scatterer itself (Curve 2 : $N_S$). It can be seen that the Wien spectra for the scatterer and for the noise inherent in the film are approximately white.

Finally, the required modulation transfer function M ($\upsilon$) is obtained from these data using the equation:

$$M = K \sqrt{\frac{N_k - N_F}{N_s}} \quad M = K\sqrt{(N_k - N_F)/N_s}$$

where $K$ represents a standardising constant.

Accordingly, it is necessary when investigating photographic materials to make two correlation or frequency analyses, one for the signal relating to the projected speckle pattern and one for the signal relating to the comparison zone. As already described, comparison field analysis gives the noise inherent in the film.

Figure 8:
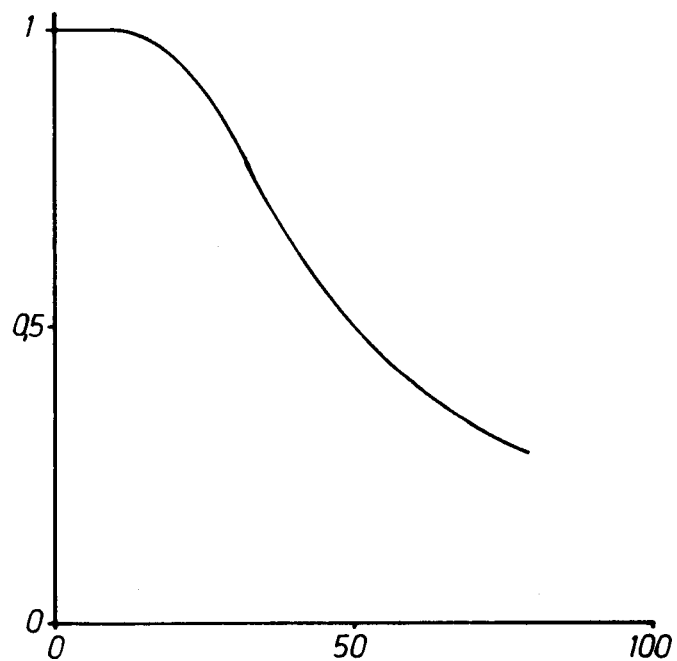
FIG. 8 shows the modulation transfer function of the film sample, calculated from the Wien Spectra, as a function of the spatial frequency.

The modulation transfer function obtained in this way for the film sample is shown in FIG. 8. The drop towards high spatial frequencies is clearly shown.

In the past, it has been necessary, in order to record a curve of this kind, to use a number of sinusoidal test screens with different spatial frequencies. Each screen was projected in a separate operation and blackening subsequently determined. It is obvious that this process was very time-consuming and troublesome. In the method of the invention, all the spatial frequencies of interest are covered with a single projection. In the method of the invention, measurement of the complete modulation transfer function takes only one to two minutes as opposed to several hours in the conventional process. The advantage which the new method has over optical diffraction methods for determining modulation transfer function is that phase components in the projected speckle pattern are eliminated.

What we claim is:

1. In a method of determining the modulation transfer function of a recording system,
   the steps of
   illuminating a photographic plate with the coherent light of a laser beam through a diffuser and subsequent aperture, and then
   processing that exposed photographic plate to produce a scatterer of known noise distribution;
   the further steps of
   projecting the scatterer with incoherent light onto the recording system to be tested,
   then subjecting the recording system to photographic processing
   and then, scanning the image on the processed recording system with a microphotometer whose output signal is subjected to a correlation analysis.

2. A method as claimed in claim 1 wherein, in addition to the projected scatterer, a comparison zone is projected on to the recording system with incoherent diffuse light of the same intensity.

3. A method as claimed in claim 1, wherein the density distribution on the recording support is scanned by translation.

4. A method as claimed in claim 1 wherein the density distribution on the recording support is scanned by rotation.

5. A method as claimed in claim 1, wherein the scatterer is projected in the form of a contact copy on to the recording support to be tested.

6. A method as claimed in claim 5 wherein, in addition to the projected scatterer, a comparison zone is projected onto the recording support with incoherent diffuse light of the same intensity.

7. A method as claimed in claim 5, wherein white light is used to project the scatterer.

8. A method as claimed in claim 5, wherein light with a selected spectral distribution is used for projecting the scatterer.

9. A method as claimed in claim 7, wherein the microphotometer is operated with white light.

10. A method as claimed in claim 7, wherein the microphotometer is preceded by filters for eliminating all light except that in a selected region of the spectrum.

* * * * *